United States Patent
Chang et al.

(10) Patent No.: US 9,026,052 B2
(45) Date of Patent: May 5, 2015

(54) MOBILE ELECTRONIC DEVICE AND CONNECTION ESTABLISHMENT METHOD BETWEEN MOBILE ELECTRONIC DEVICES

(71) Applicant: HTC Corporation, Taoyuan County (TW)

(72) Inventors: Edward Chang, Taoyuan County (TW); Chi-Pang Chiang, Taoyuan County (TW); Te-Chuan Liu, Taoyuan County (TW); Chung-Huan Mei, Taoyuan County (TW); Zih-Ci Lin, Taoyuan County (TW); Yi-Yu Chung, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 179 days.

(21) Appl. No.: 13/748,601

(22) Filed: Jan. 24, 2013

(65) Prior Publication Data
US 2014/0206287 A1    Jul. 24, 2014

(51) Int. Cl.
*H04B 7/00*    (2006.01)
*H04W 76/02*    (2009.01)

(52) U.S. Cl.
CPC ................................ *H04W 76/02* (2013.01)

(58) Field of Classification Search
CPC ..... G06F 3/017; G06F 3/0346; G06F 1/1626; G06F 1/1694; G06F 1/1698; G06F 3/011; G06F 3/0414; G06F 3/038; G06F 3/04883
USPC ...................................................... 455/41.2
See application file for complete search history.

(56) References Cited

U.S. PATENT DOCUMENTS

| | | | |
|---|---|---|---|
| 7,532,196 B2 | 5/2009 | Hinckley | |
| 2009/0031258 A1 | 1/2009 | Arrasvuori et al. | |
| 2011/0187652 A1 | 8/2011 | Huibers | |
| 2012/0198353 A1 | 8/2012 | Lee et al. | |
| 2012/0289159 A1 | 11/2012 | Palin et al. | |
| 2013/0222266 A1* | 8/2013 | Gardenfors et al. | 345/173 |
| 2014/0006954 A1* | 1/2014 | Raffa et al. | 715/733 |

FOREIGN PATENT DOCUMENTS

| | | |
|---|---|---|
| TW | 201117633 | 5/2011 |
| TW | 201208321 | 2/2012 |
| TW | 201239675 | 10/2012 |
| TW | 201242281 | 10/2012 |

OTHER PUBLICATIONS

"Office Action of Taiwan Counterpart Application", issued on Sep. 24, 2014, p. 1-p. 8, in which the listed references were cited.

* cited by examiner

*Primary Examiner* — Ajibola Akinyemi
(74) *Attorney, Agent, or Firm* — Jianq Chyun IP Office

(57) ABSTRACT

A mobile electronic device and a connection establishment method between the mobile electronic devices are provided. The connection establishment method includes the following steps. When a first mobile electronic device detects a control gesture applied to the first mobile electronic device, whether a second mobile electronic device is searched by the first mobile electronic device is determined, in which the second mobile electronic device detects the same control gesture applied to the second mobile electronic device. If the second mobile electronic device is searched by the first mobile electronic device, a first proximal wireless network connection between the first mobile electronic device and the second mobile electronic device is then established.

18 Claims, 6 Drawing Sheets

MOBILE ELECTRONIC DEVICE AND CONNECTION ESTABLISHMENT METHOD BETWEEN MOBILE ELECTRONIC DEVICES

TECHNICAL FIELD

The invention relates to a connection establishment method between mobile electronic devices, and more particularly, to a method for establishing a connection between mobile electronic devices through using gestures and an electronic device using the same.

BACKGROUND

Along with the information and communication technology has been developed continuously, and the improvement on various electronic products equipped with various functions has been advanced, electronic products have become indispensable in people's daily life. The common mobile electronic devices are usually equipped with a network communication interface which provides a user equipment to communicate information or transmit data with other mobile electronic devises via the network communication interface. Nowadays, almost everyone has a smart phone, a mobile internet device or a tablet PC in social events or family gatherings. On such occasion when the users are near each other, a plurality of practical uses can be created if the electronic devices at close range can be connected by a proximal wireless network. For instance, the electronic devices are capable of transmitting files such as documents or photographs through the proximal wireless network, and are also capable of communicating information through the proximal wireless network.

Before information or data is transmitted between various electronic devices, the electronic device establishes a connection with another electronic device between them. Generally speaking, the user sends explicit instructions by utilizing the input device such as buttons or a touch screen on the electronic device, so as to begin with establishing the communication connection between the electronic devices. To be specific, the user has to activate the communication interface in a manual way manner firstly. Subsequently, it is possible that the user is required to select the electronic device to be paired from the connection list. Then, the connection is established between the two electronic devices. However, due to the cumbersome procedures and the complexity of the pairing connection between the electronic devices, it is often inconvenience and troublesome for the user in terms of using. Additionally, if a plurality of electronic devices supporting the same wireless communication technology exist within an effective transmission range, the pairing-up error is most likely to occur, so that the electronic device is incapable of establishing the connection with the electronic device expected by the user to transmit data.

SUMMARY

Accordingly, the invention is directed to a mobile electronic device and a connection establishment method between mobile electronic devices, which significantly simplifies the operating steps of establishing the connection between the mobile electronic devices for the user, so as to enhance the usage convenience of the mobile electronic device.

The invention provides a connection establishment method between the electronic devices, and the method includes the following steps. When the first mobile electronic device detects a control gesture applied to the first mobile electronic device through a sensor thereof, the first mobile electronic device determines whether a second mobile electronic device is searched, in which the second mobile electronic device detects the control gesture applied to the second mobile electronic device. If the second mobile electronic device is searched by the first mobile electronic device, a first proximal wireless network connection between the first mobile electronic device and the second mobile electronic device is established.

From another perspective, the invention provides a mobile electronic device. The mobile electronic device includes a sensor, a network module and a processor. The sensor detects a control gesture applied to the mobile electronic device. The network module establishes a proximal wireless communication connection. The processor is coupled to the sensor and the network module, in which the processor determines whether another mobile electronic device is searched by the mobile electronic device when the control gesture applied to the mobile electronic device is detected by the sensor, in which the another mobile electronic device detects the control gesture applied to the another mobile electronic device. If the processor determines the another mobile electronic device is searched by the mobile electronic device, the network module establishes a first proximal wireless network connection between the mobile electronic device and the another mobile electronic device.

Based on the above, in the connection establishment method between the mobile electronic devices provided by the invention, two mobile electronic devices may automatically establish the proximal wireless network connection between each other after respectively being applied to a same control gesture from the user. In this way, the operating steps of establishing the connection between the mobile electronic devices may be simplified significantly, and the occurrence of pairing-up error via the connection may also be prevented, so as to enhance the usage convenience of the mobile electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
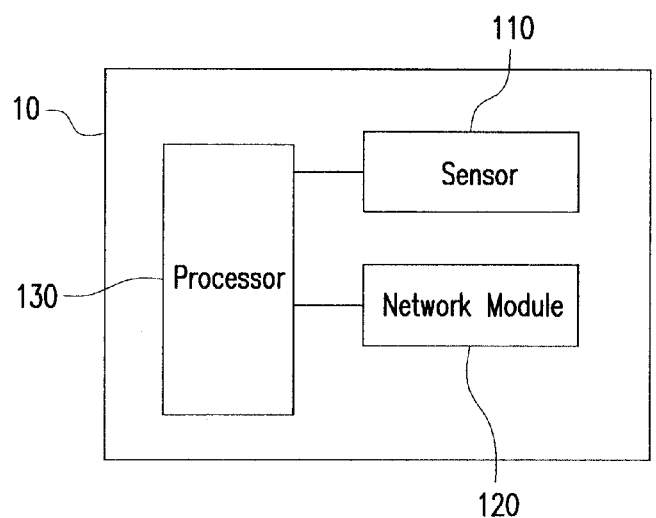
FIG. 1A is a block diagram illustrating a mobile electronic device according to an embodiment of the invention.

FIG. 1A is a block diagram illustrating a mobile electronic device according to an embodiment of the invention. Referring to FIG. 1A, the mobile electronic device 10 includes a sensor 110, a network module 120 and a processor 130. In the embodiment, the mobile electronic device 10 may be a portable mobile electronic device such as a mobile phone, a smart phone, a personal digital assistant, a tablet computer, a digital camera, an e-book reader, or a gaming machine, although the invention is not limited thereto.

The sensor 110 can be a motion sensor such as a gyrosensor or an acceleration sensor (e.g., G-sensor). The sensor 110 can also be a touch sensor such as a resistive touch panel, a capacitive touch panel, an ultrasonic touch panel, an infrared touch panel or an electromagnetic induction touch panel, although the invention is not limited thereto. The sensor 110 is capable of detecting a control gesture applied to the mobile electronic device 10.

For example, the motion sensor may detect the inertial information of the mobile electronic device 10 such as the moving velocity, the acceleration or the displacement of the mobile electronic device 10. Therefore, when the user holds the mobile electronic device 10 to perform a control gesture such as moving, shaking, swaying, or marking out a certain trajectory, the motion sensor may detect the information such as the displacement of the mobile electronic device 10 and the traveled trajectory pattern. In other words, the control gesture corresponds to the movement of the mobile electronic device 10 in space.

Additionally, if the sensor 110 is a touch sensor, the touch sensor may sense the touch operation applied by the user on the sensor 110, and the control gesture then corresponds to the touch operation detected by the sensor 110. For example, if the mobile electronic device has a touch screen (not shown) where the touch screen is a combination of a touch sensor and a screen, the touch screen may detect the touch operation executed by the user on the touch screen, and the touch operation can be a slide operation or one or more tap operations. The control gesture corresponds to the slide operation or the one or more tap operations applied onto the touch screen of the mobile electronic device 10, although the invention is not limited thereto.

The network module 120 is configured to establish a proximity-based connection which is capable of providing network communication connections, so that the mobile electronic device 10 may connect to other mobile electronic devices through the proximal wireless network. The proximity-based connection may include a wireless personal area network (WPAN) or a wireless local area network (WLAN) according to the classification of communication networks, although the invention is not limited thereto. For instance, the WPAN is based on the IEEE 802.15 standard to establish connections, whereas the WLAN is based on the IEEE 802.11 standard to establish connections. To be more specific, the network module 120 can be an element of Bluetooth wireless communication technology that supports the WPAN, and can be an element of wireless fidelity (Wi-Fi) communication technology that supports the WLAN, although the invention is not limited thereto. To be more specific, the network module 120 may include one or a plurality of elements supporting various types of communication technologies.

The processor 130 is coupled to the sensor 110 and the network module 120, and is, for example, a central processing unit (CPU), a programmable microprocessor, a digital signal processor (DSP), a programmable controller, an application specific integrated circuit (ASIC), a programmable logic device (PLD), or any other hardware device with a computing capability.

Figure 1B:
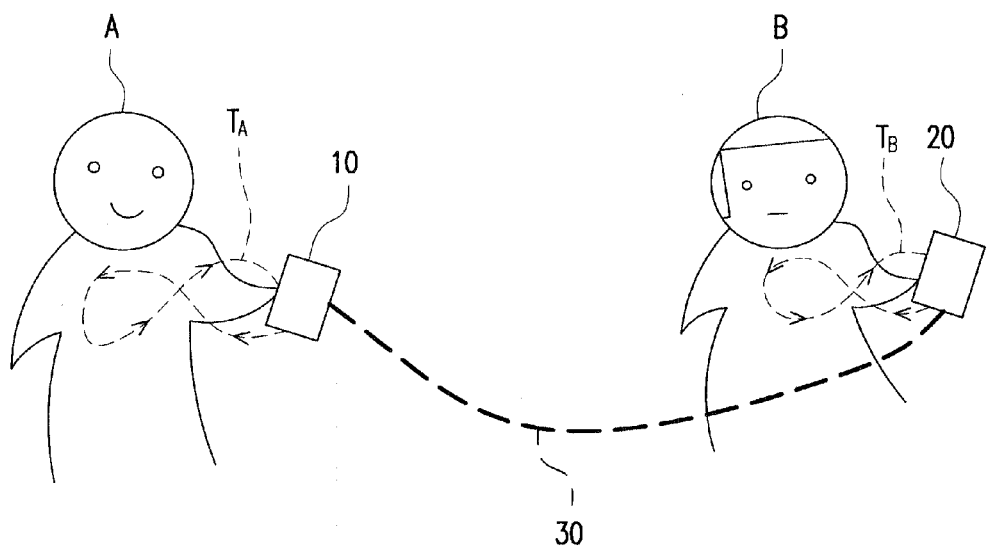
FIG. 1B is a schematic diagram illustrating two mobile electronic devices establishing a connection according to an embodiment of the invention.

FIG. 1B is a schematic diagram illustrating two mobile electronic devices establishing a connection according to an embodiment of the invention. Referring to FIG. 1B, in the embodiment, the constitution of the mobile electronic device 20 is identical or similar to the mobile electronic device 10, and thus a detailed description thereof will be omitted. It is assumed that the mobile electronic device 10 has been carried out a control gesture by a user A (that is, the user A holds the mobile electronic device 10 and marks-out a trajectory $T_A$ in space), and the mobile electronic device 20 has been carried out the same control gesture by a user B (that is, the user B holds the mobile electronic device 20 and marks-out a trajectory $T_B$ in space, in which the trajectory $T_A$ and the trajectory $T_B$ are substantially the same), where a proximal wireless network connection 30 is automatically established between the mobile electronic device 10 and the mobile electronic device 20.

Figure 2:
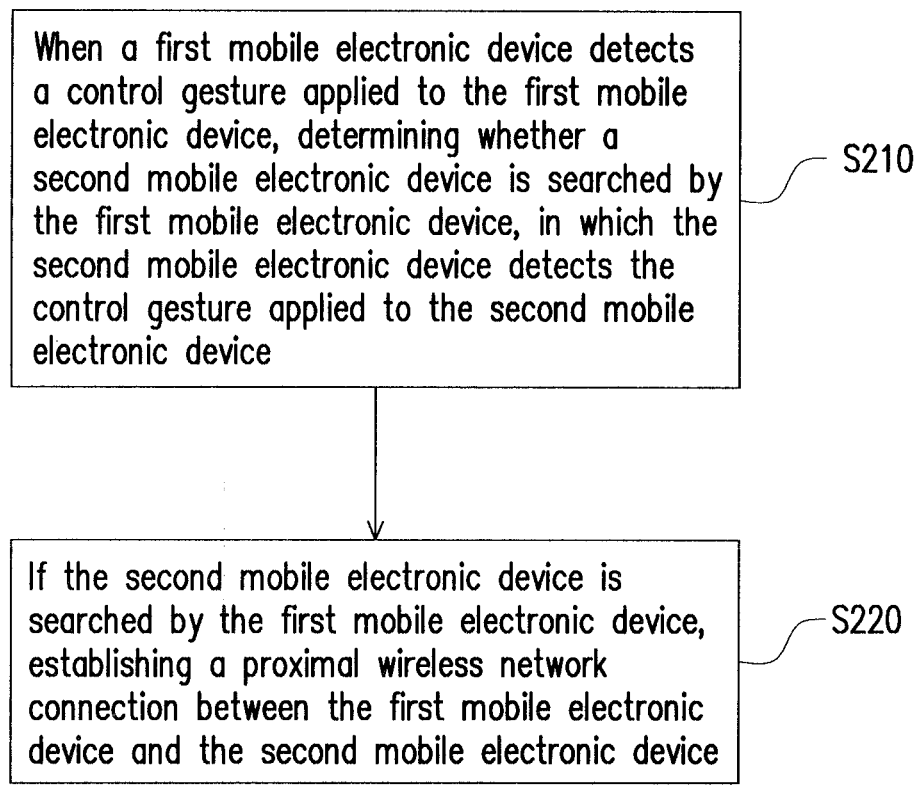
FIG. 2 is a flowchart diagram illustrating a connection establishment method between mobile electronic devices according to an embodiment of the invention.

Another embodiment is exemplified in the following description as to further illustrate how to establish the proximal wireless network connection 30 between the electronic devices 10 and 20 according to the control gesture. Referring to FIG. 1A and FIG. 2 together, in which FIG. 2 is a flowchart diagram illustrating a connection establishment method between mobile electronic devices according to an embodiment of the invention.

Firstly, as shown in step S210, when the mobile electronic device 10 detects a certain control gesture applied to the mobile electronic device 10, the processor 130 determines whether the mobile electronic device 20 is searched by the mobile electronic device 10, in which the mobile electronic device 20 detects the same control gesture applied to the mobile electronic device 20. In detail, when the sensor 110 detects the control gesture, the processor 130 controls the network module 120 to turn on and begins to externally search another electronic device through the network module 120. It should be noted that the mobile electronic device 10 does not search the another electronic device randomly, the objective for the mobile electronic device 10 to search is also because of the mobile electronic device 20 that detects the same control gesture and being turned on the network module thereof.

As shown in step S220, if the processor 130 determines that the mobile electronic device 20 is searched by the mobile electronic device 10, then the network module 120 establishes the proximal wireless network connection 30 between the mobile electronic devices 10 and 20. Roughly speaking, when the mobile electronic devices 10 and 20 respectively detect the same kind of control gestures being applied thereto, the mobile electronic devices 10 and 20 may automatically establish the proximal wireless network connection 30 between them.

In other words, in an embodiment, when two users wish two mobile electronic devices to transmit information through a proximal wireless network, a same control gesture may be applied to both of the mobile electronic devices, respectively. Accordingly, the two afore-described mobile electronic devices are then capable of executing connection pairing automatically and establishing a proximal wireless network connection between the two mobile electronic devices, and accordingly transmitting information. The transmitted information can be files stored in the mobile electronic device, characters or any related information displayed on the user interface of the mobile electronic device, or screenshots of the user interface, for instance, although the invention is not limited thereto.

It should be noted that implementations of the invention are not limited to the afore-described embodiments, and the afore-described embodiments can be suitably modified according to an actual requirement. For example, when the mobile electronic device 20 is not searched by the mobile electronic device 10, the mobile electronic device 10 may serve as a master terminal in the proximal wireless network. In the following description, the step of establishing the connection between the mobile electronic devices is fully illustrated in another embodiment of the invention.

Figure 3:
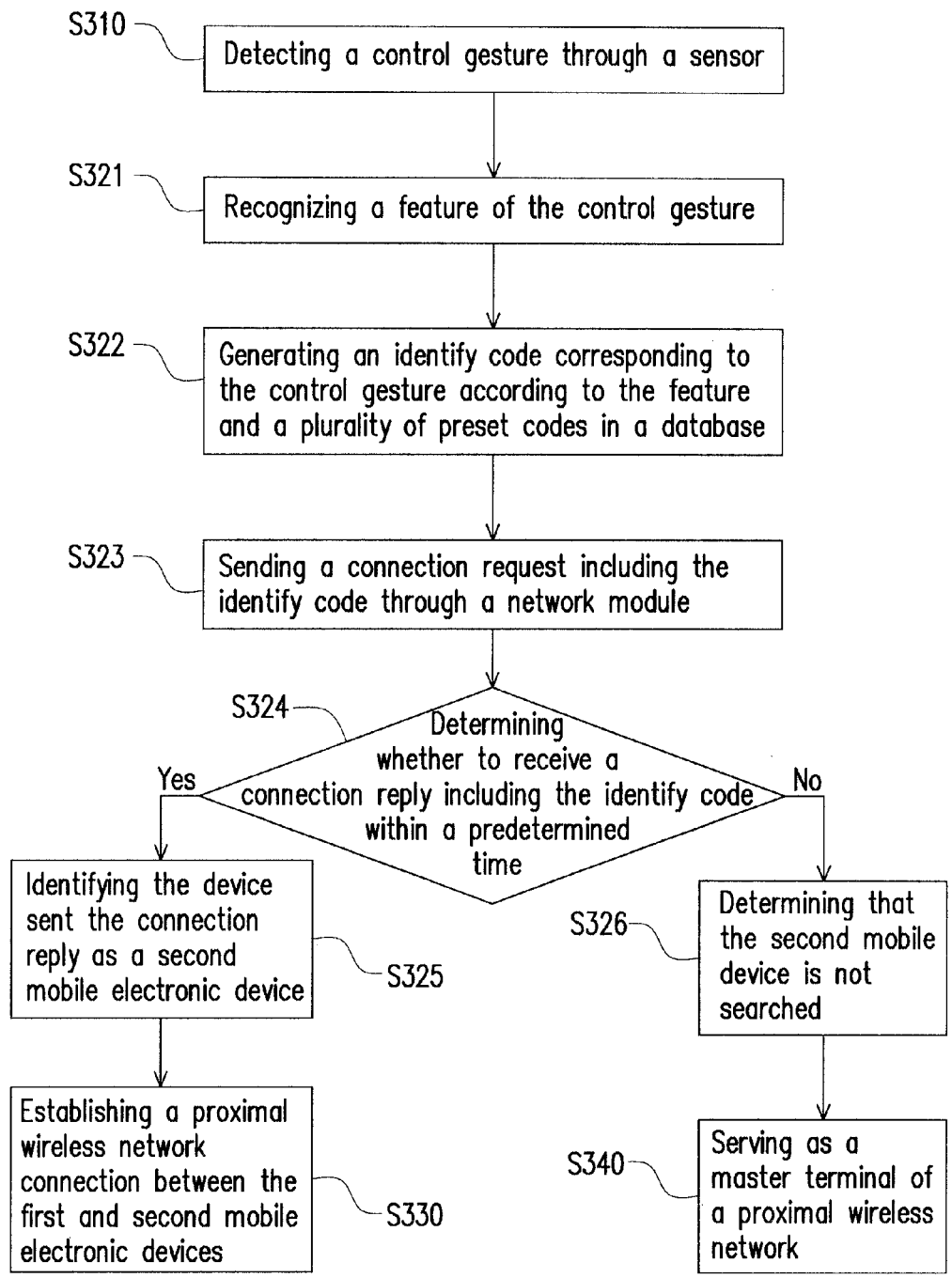
FIG. 3 is a flowchart diagram illustrating a connection establishment method between mobile electronic devices according to another embodiment of the invention.
Figure 4:
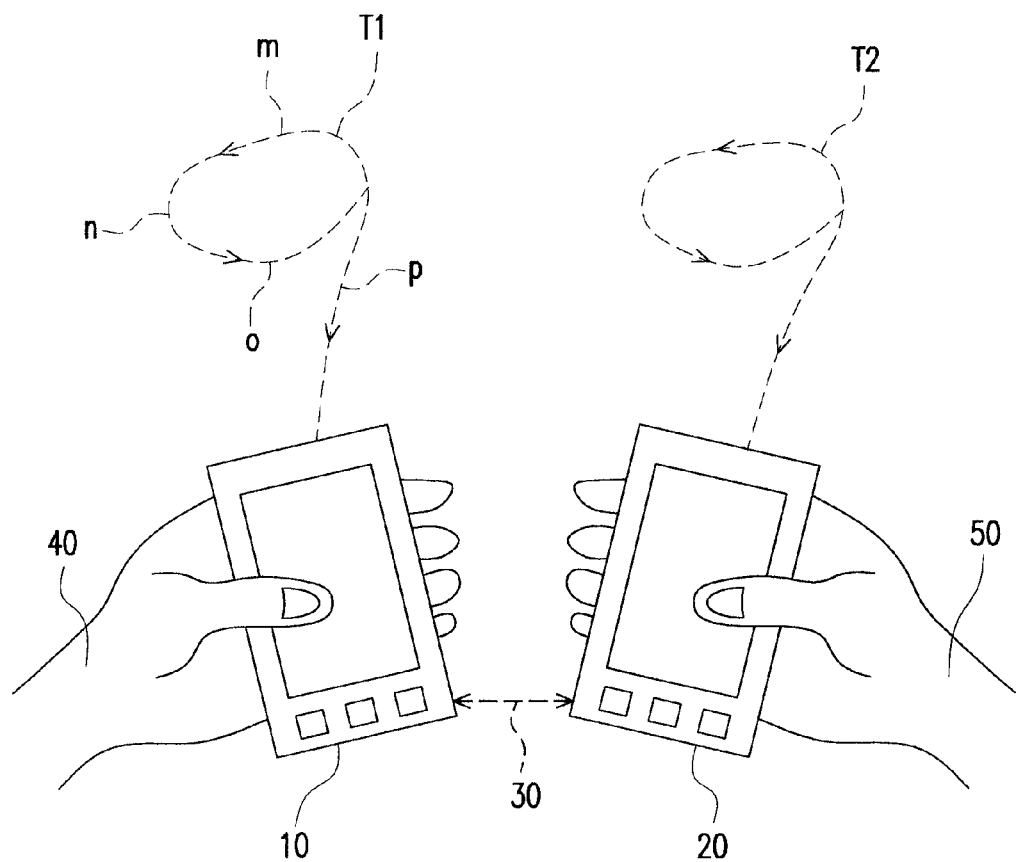
FIG. 4 is a scenario diagram illustrating a connection being established between mobile electronic devices according to another embodiment of the invention.

FIG. 3 is a flowchart diagram illustrating a connection establishment method between mobile electronic devices according to another embodiment of the invention, and FIG. 4 is a scenario diagram illustrating a connection being established between mobile electronic devices according to another embodiment of the invention. Referring to FIG. 1A, FIG. 3 and FIG. 4 together, in the embodiment, it is assumed that the sensor 110 is a motion sensor, and the control gesture corresponds to a movement of the mobile electronic device 10 in space.

Firstly, as shown in step S310, the mobile electronic device 10 detects the control gesture applied to the mobile electronic device 10 through the sensor 110. As shown in FIG. 4, the control gesture of the embodiment is that the user holds the mobile electronic device 10 by a hand 40 causing the mobile electronic device 10 to move in space, so as to form a trajectory T1. When the mobile electronic device 10 is moved by the user, the sensor 110 generates corresponding detecting values continuously. In order to explain conveniently, the control gesture of the mobile electronic device 10 in the following description is referred to as a control gesture G1.

Next, as shown in step S321, the processor 130 recognizes a feature of the control gesture G1 according to the detecting values generated by the sensor 110. For example, the processor 130 may recognize the control gesture G1 according to the detecting values which is composed of the trajectories m, n, o and p. The processor 130 may further recognize that the trajectories m, n and o are all arc lines and the trajectory p is a straight line. Further, the processor 130 may also judge the curvature and direction of each of the trajectories from the detecting values. The shape, length and direction of the trajectory may all be served as the feature of the control gesture G1.

Subsequently, in step S322, the processor 130 generates an identify code corresponding to the control gesture G1 according to the feature of the control gesture G1 and a plurality of preset codes in a database. For example, the processor 130 may correspond to the preset codes in the database to generate the identify code corresponding to the control gesture G1 according to the composed result of the trajectories m, n, o and p. In other words, the processor 130 finds out that the control gesture G1 is similar to the pattern of the value of "9" according to the composed result of the trajectories m, n, o and p, and the processor 130 searches the corresponding identify code from the preset codes in the database according to the result of "9". Additionally, the processor 130 may also use the trajectories m, n, o, p to correspond to the preset codes in the database, so as to generate the identify code corresponding to the control gesture G1. In other words, the processor 130 individually uses the trajectories m, n, o, p to correspond to one of the preset codes in the database, in order to search the preset codes corresponding to the trajectories m, n, o, p to compose of the identify code of the control gesture G1. Any methods for generating the afore-described identify code is not restricted or limited in the invention, any methods for generating the identify code capable of reflecting the feature of the control gesture still belongs to the scope of the invention.

In step S323, the processor 130 controls the network module 120 to send a connection request including the identify code. In other words, after the mobile electronic device 10 recognized the feature of the control gesture G1, the mobile electronic device 10 then begins to search for a specific object to be paired all around. For searching the specific object to be paired, the mobile electronic device 10 sends the connection request including the identify code.

In step S324, the mobile electronic device 10 determines whether to receive a connection reply including the identify code within a predetermined time, so as to verify whether any mobile device may provide the connection.

In step S325, when the mobile electronic device 10 receives the connection reply including the identify code, the processor 130 identifies the device sent the connection reply as the mobile electronic device 20, which also indicates the mobile electronic device 10 has searched the correct mobile electronic device to be paired with.

For example, as shown in FIG. 4, the user for the mobile electronic device 20 in the embodiment holds the mobile electronic device 20 by a hand 50 causing the mobile electronic device 20 to move in space, so as to form a trajectory T2. Similarly, in order to explain conveniently, the control gesture of the mobile electronic device 20 in the following description is referred to as a control gesture G2. Since the moving of the mobile electronic devices 10, 20 in space and the formation of the trajectories T1, T2 are substantially the same, that is to say, the control gesture G1 and the control gesture G2 are the same kind of control gestures. Therefore, the mobile electronic device 10 and the mobile electronic device 20 may generate an identical identify code. Hence, when the mobile electronic device 20 receives the connection request including the identify code sent by the mobile electronic device 10, the mobile electronic device 20 confirms that the mobile electronic device 10 is the correct object to be paired with. Then, the mobile electronic device 20 sends the connection reply to the mobile electronic device 10, and the identify code is carried within the connection reply in order for the mobile electronic device 10 to identify. Accordingly, after the mobile electronic device 10 receives the connection reply, the mobile electronic device 10 then regards the mobile electronic device 20 sent the connection reply as the object to be connected with.

In step S330, due to the mobile electronic device 20 is searched by the mobile electronic device 10, the network module 120 of the mobile electronic device 10 automatically establish the proximal wireless network connection 30 between the mobile electronic devices 10 and 20. Thereafter, the mobile electronic device 10 and the mobile electronic device 20 are capable of transmitting data through the proximal wireless network connection 30, in which the transmission direction of data can be bidirectional, which can also be unidirectional, although the invention is not limited thereto.

For example, if the mobile electronic devices 10 and 20 both have the Bluetooth transmission, the mobile electronic device 10 may search the object to be connected through searching the nearby Bluetooth devices. When the Bluetooth device with the same identify code is found, the mobile electronic device 10 then identifies the Bluetooth device with the same identify code (that is, the mobile electronic device 20) as the object to be connected, and establishes the Bluetooth transmission connection with the mobile electronic device 20.

Roughly speaking, after one user applies the control gesture to the own mobile electronic device, another user only has to apply the same control gesture to the own mobile electronic device, and then the connection between the two mobile electronic devices is automatically established. Additionally, the mobile electronic devices 10 and 20 can also be the mobile electronic devices both supporting the Wi-Fi communication technology or the Wi-Fi direct communication technology, although the invention is not limited thereto.

In another embodiment, the data transmission between the mobile electronic devices 10 and 20 is required to pass an identification procedure. Specifically, in the mobile electronic devices 10 and 20, the mobile electronic device firstly detected the control gesture may perform the identification procedure on the mobile electronic device secondly detected the control gesture, so as to determine whether to perform the data transmission. In other words, after the connection between the mobile electronic devices is automatically established, the mobile electronic device firstly detected the control gesture may further determine whether to connect with the mobile electronic device as the user expected through the identification procedure, so as to reduce the connection pairing-up error to occur. The identification procedure can be the identification information displaying the current connected mobile electronic device (such as the title of the device, the codename or the telephone number, but is not limited thereto) for the user to view, and after the user input the confirmation instruction, the identification information is completed.

On the other hand, in step S326, if the mobile electronic device 10 does not receive the connection reply including the identify code within the predetermined time, the processor 130 determines that the mobile electronic device 20 is not searched. For instance, the predetermined time may be set as one minute, but is not limited thereto. Then, if the mobile electronic device 10 fails to receive the connection reply including the identify code within one minute, this indicates that the mobile electronic device with the same identify code does not exist nearby the mobile electronic device 10 at that present time.

Thus, in step S340, the mobile electronic device 10 serves as the master terminal of the proximal wireless network. For example, it is assumed that the network module 120 includes an element (such as a Bluetooth chip) supporting the Bluetooth wireless communication technology, and when the control gesture is detected by the sensor 110, the processor 130 turns on the network module 120 accordingly, so that after the mobile electronic device 10 activates the Bluetooth service, the mobile electronic device 10 may firstly detect whether there are other Bluetooth devices sending the connection request including the same identify code nearby. If not, the mobile electronic device 10 may set itself as the master terminal firstly. Next, the master terminal may take itself as the centre and send the connection request to all around or continue to wait for the connection request sent by other Bluetooth devices, and then the master terminal recognizes the correct object to be connected according to the identify code and establishes the Bluetooth connection.

It should be noted that, in the connection establishment method disclosed by the invention, other than the peer-to-peer wireless communication method, the wireless communication method may also be built in the one-to-many or many-to-many manner. In other words, other than establishing the connection with the mobile electronic device 20, the mobile electronic device 10 may also establish a connection with another mobile electronic device concurrently. Another embodiment is exemplified in the following description to further illustrate the invention.

Figure 5:
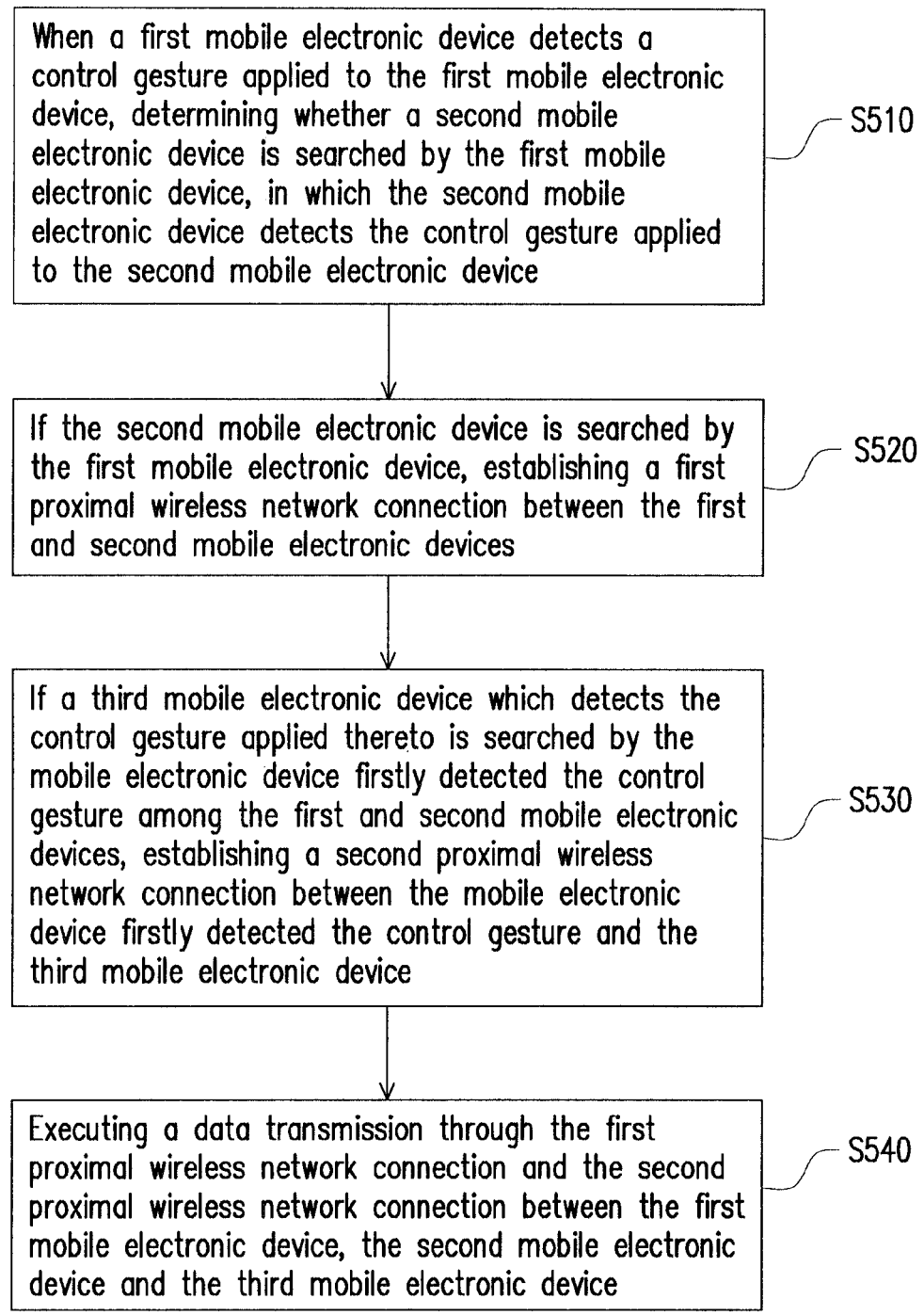
FIG. 5 is a flowchart diagram illustrating a connection establishment method between mobile electronic devices according to another embodiment of the invention.
Figure 6:
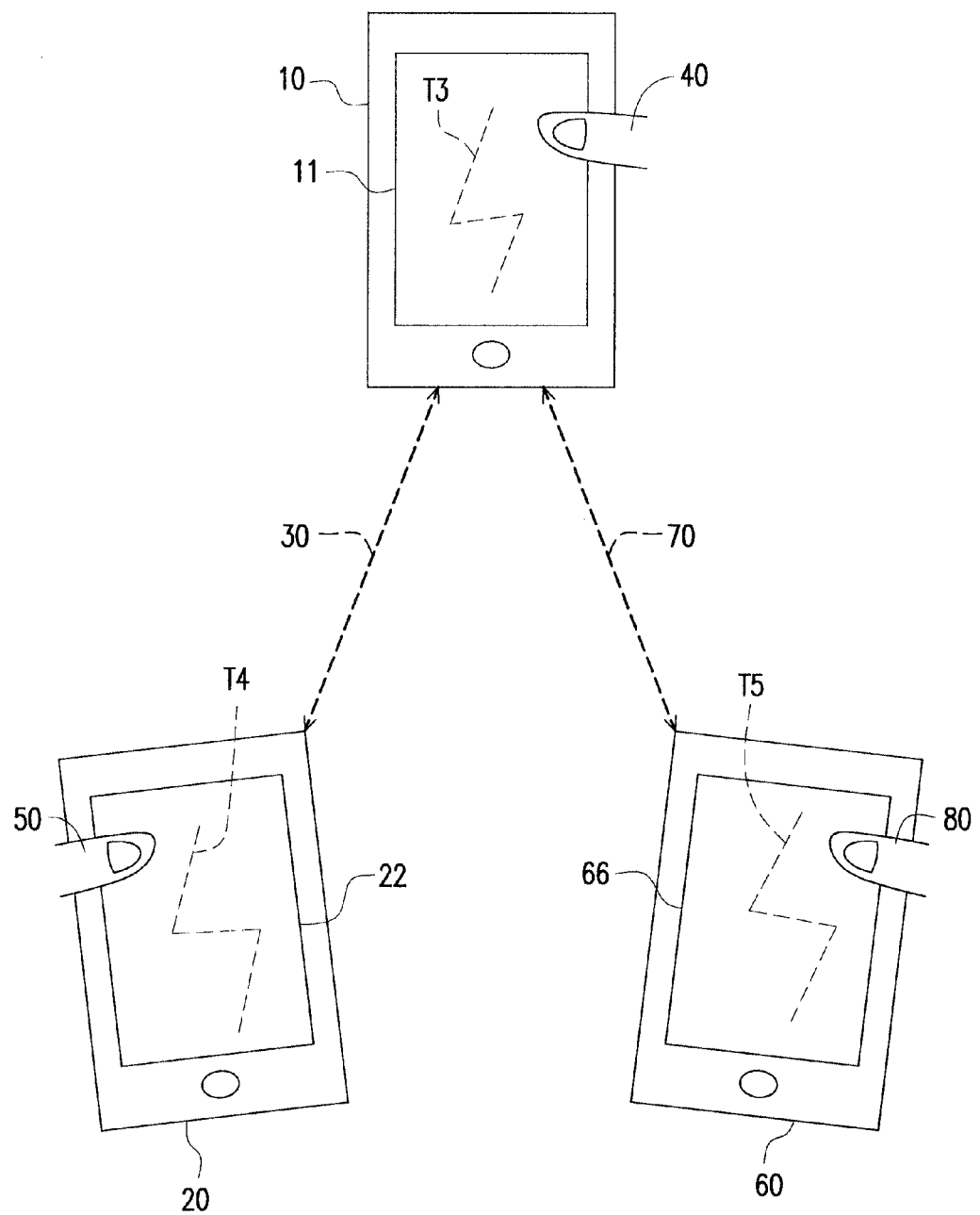
FIG. 6 is a scenario diagram illustrating a connection being established between mobile electronic devices according to another embodiment of the invention.

FIG. 5 is a flowchart diagram illustrating a connection establishment method between mobile electronic devices according to another embodiment of the invention, and FIG. 6 is a scenario diagram illustrating a connection being established between mobile electronic devices according to another embodiment of the invention. Referring to FIG. 1, FIG. 5 and FIG. 6 together, in the embodiment, the sensor 110 is a touch sensor, and the control gesture is the touch operation applied by the user on the touch screen.

Firstly, as shown in step S510, when the control gesture applied to the mobile electronic device 10 is detected, the mobile electronic device 10 begins to search other mobile electronic device being applied to the same control gesture. As shown in FIG. 6, the control gesture in the embodiment is the touch operation executed by the hand 40 of the user on the touch screen 11. Furthermore, the touch operation executed by the user in the embodiment is the slide operation by the hand 40 on the touch screen 11, and the slide operation forms a trajectory T3 similar to a lightning pattern. After the touch screen 11 receives the touch operation executed by the user, the sensor 110 generates the corresponding detecting values continuously. In order to explain conveniently, the control gesture of the mobile electronic device 10 in the following description is referred to as a control gesture G3.

Thereafter, if the mobile electronic device 20 also detects the control gesture applied to the touch screen 22 of the mobile electronic device 20, namely, the slide operation executed by the hand 50 of the user on the touch screen 22 of the mobile electronic device 20, the slide operation forms a trajectory T4 due to the hand 50 being slide on the touch screen 22. Similarly, in order to explain conveniently, the control gesture of the mobile electronic device 20 in the following description is referred to as a control gesture G4. Since both of the trajectories T3 and T4 are a sliding trajectory similar to lightning, the trajectory T3 and the trajectory T4 are substantially the same, that is to say, the control gesture G3 and the control gesture G4 are the same kind of control gestures. Therefore, the mobile electronic device 20 and the mobile electronic device 10 are capable of generating the same identify code.

Subsequently, as shown in step S520, under the circumstance that the mobile electronic device 20 is searched by the mobile electronic device 10, the network module 120 establishes the proximal wireless network connection 30 between the mobile electronic devices 10 and 20.

Next, in step S530, a mobile electronic device 60 is searched by the mobile electronic device 10 firstly detected the control gesture G3, and the mobile electronic device 60 also detects the same control gesture applied to the mobile electronic device 60, and then the mobile electronic device 10 establishes a proximal wireless network connection 70 between the mobile electronic devices 10 and 60. In the embodiment, the constitution of the mobile electronic device 60 is identical or similar to the mobile electronic device 10, and thus a detailed description thereof will be omitted. As shown in FIG. 6, the user for the mobile electronic device 60 in the embodiment executes the slide operation on the touch screen 66, the slide operation forms a trajectory T5 due to the hand 80 being slide on the touch screen 66. Similarly, in order to explain conveniently, the control gesture of the mobile electronic device 60 in the following description is referred to as a control gesture G5. The method for establishing the connection between the mobile electronic devices 10 and 60 is the same as the method for establishing the connection between the mobile electronic devices 10 and 20, and thus a detailed description thereof will be omitted. However, it should be noted that the control gestures G3, G4, and G5 are all the same control gesture similar to the lightning pattern. Therefore, the mobile electronic device 10 may establish connections with the mobile electronic devices 50 and 60, respectively.

In step S540, the mobile electronic devices 10, 20 and 60 are capable of executing the data transmission through the proximal wireless network connection 30 and the proximal wireless network connection 70. For example, if the mobile electronic devices 10, 20 and 60 are concurrently the devices supporting the Wi-Fi communication technology (that is, each of the network modules includes the element supporting the Wi-Fi communication technology), the communication between the mobile electronic devices may be performed in an ad hoc manner, and may also be performed with the coordination of an access point (AP). In the embodiment, the role of the mobile electronic device firstly detected the control gesture G3 is to serve as the access point in the Wi-Fi internet, and the mobile electronic devices 20 and 60 serve as the client ends in the Wi-Fi internet. Accordingly, after the mobile electronic device 10 respectively establishes the proximal wireless network connection 30 and the proximal wireless network connection 70 with the mobile electronic devices 20 and 60, the mobile electronic device 20 and the mobile electronic device 60 are capable of executing the data transmission through the mobile electronic device 10.

Roughly speaking, for the plurality of mobile electronic devices detected the same control gesture, each of the mobile electronic devices may be connected with each other directly or may be connected through another mobile electronic device. Accordingly, the plurality of mobile electronic devices may achieve establishing the connection to share information through the simply control method.

It should be noted that, the slide operation is exemplified in the afore-described embodiment to illustrate the invention, but the touch operation regarded as the control gesture may also be tap operation performed by the user onto the touch screen, although the invention is not limited thereto.

Based on the foregoing, in the invention, the proximal wireless network connection between the mobile electronic devices is established by the control gesture of the user. The users can establish the connections between the mobile electronic devices through applying the same control gesture to their own mobile electronic devices. In other words, the control gesture is served as the proof of the connection being established, and thus the complicated setting procedure is eliminated and the occurrence of connection pairing-up error is reduced, so as to enhance the usage convenience of the mobile electronic device. Additionally, other than the one-to-one communication connection, the method in the invention can also establish the connections between the plurality of mobile electronic devices, so that the information sharing between the mobile electronic devices can also be implemented through the simple steps without additional setting for the user and the manual operating procedure, so as to improve the efficiency of information sharing.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A connection establishment method applicable to a mobile electronic device, wherein the mobile electronic device comprises a sensor, a processor and a network module, and the processor is coupled to the sensor and the network module, the connection establishment method comprising:
   (a) detecting a control gesture applied to the mobile electronic device through the sensor;
   (b) determining whether another mobile electronic device is searched through the processor when the control gesture applied to the mobile electronic device is detected, wherein the another mobile electronic device detects the control gesture applied to the another mobile electronic device; and
   (c) establishing a first proximal wireless network connection between the mobile electronic device and the another mobile electronic device through the network module if the another mobile electronic device being searched is determined,
   wherein the sensor is a motion sensor, and the control gesture applied to the mobile electronic device corresponds to a movement in a space of the mobile electronic device,
   wherein the step (b) comprises the following steps:
   (b1) recognizing a feature of the control gesture through the processor; and
   (b2) generating an identify code corresponding to the control gesture through the processor according to the feature and a plurality of preset codes in a database.

2. The connection establishment method according to claim 1, wherein if the another mobile electronic device not being searched is determined, the connection establishment method further comprises:
   serving the mobile electronic device as a master terminal of a proximal wireless network, so as to continually send a connection request within a area or continue to wait for another connection request from yet another mobile electronic device.

3. The connection establishment method according to claim 1, wherein the step (b) further comprises the following steps:
   (b3) sending a connection request comprising the identify code through the network module; and
   (b4) determining that the network module receives a connection reply comprising the identify code within a predetermined time through the processor, so as to determine the another mobile electronic device is searched.

4. The connection establishment method according to claim 3, wherein the step (b4) is a step of determining that the network module does not receive the connection reply comprising the identify code within the predetermined time through the processor and then serving the mobile electronic device as a master terminal of a proximal wireless network.

5. The connection establishment method according to claim 1, wherein the sensor is a touch sensor, and the control gesture applied to the mobile electronic device corresponds to at least one tap operation continuously applied onto a touch screen of the mobile electronic device.

6. The connection establishment method according to claim 1, wherein the sensor is a touch sensor, and the control gesture applied to the mobile electronic device corresponds to a slide operation applied onto a touch screen of the mobile electronic device.

7. The connection establishment method according to claim 1, further comprising a step of executing a data transmission between the network module and the another mobile electronic device through the first proximal wireless network connection.

8. The connection establishment method according to claim 7, wherein before the step of executing the data transmission between the network module and the another mobile electronic device, the method further comprises a step of executing an identification procedure through the processor to determine whether to execute the data transmission through the network module.

9. The connection establishment method according to claim 1, further comprising the following steps:
   determining by the processor that yet another mobile electronic device is searched through the network module, wherein the yet another mobile electronic device detects the control gesture applied to the yet another mobile electronic device;
   setting the mobile electronic device as an access point by the processor; and
   establishing a second proximal wireless network connection between the mobile electronic device and the yet another mobile electronic device through the network module to cause the mobile electronic device, the another mobile electronic device and the yet another mobile electronic device to execute a data transmission through the first proximal wireless network connection and the second proximal wireless network connection by serving the mobile electronic device as the access point.

10. A mobile electronic device, comprising:
   a sensor, configured to detect a control gesture applied to the mobile electronic device, wherein the sensor is a motion sensor, and the control gesture applied to the mobile electronic device corresponds to a movement in a space of the mobile electronic device;
   a processor, coupled to the sensor and configured to determine whether another mobile electronic device is searched when the control gesture applied to the mobile electronic device is detected by the sensor, wherein the another mobile electronic device detects the control gesture applied to the another mobile electronic device; and
   a network module, coupled to the processor, and configured to establish a first proximal wireless network connection between the mobile electronic device and the another mobile electronic device if the processor determines the another mobile electronic device is searched,
   wherein the processor is further configured to recognize a feature of the control gesture and generate an identify code corresponding to the control gesture according to the feature and a plurality of preset codes in a database.

11. The mobile electronic device according to claim 10, wherein the mobile electronic device serves as a master terminal of a proximal wireless network if the processor determines the another mobile electronic device is not searched, so as to continually send a connection request within a area or continue to wait for another connection request from yet another mobile electronic device.

12. The mobile electronic device according to claim 10, wherein:
   the network module is further configured to send a connection request comprising the identify code; and
   the processor is further configured to determine that the network module receives a connection reply comprising the identify code within a predetermined time, so as to determine the another mobile electronic device is searched.

13. The mobile electronic device according to claim 12, wherein the processor is further configured to determine that the network module does not receive the connection reply comprising the identify code within a predetermined time, and then the mobile electronic device serves as a master terminal of a proximal wireless network.

14. The mobile electronic device according to claim 10, wherein the sensor is a touch sensor, and the control gesture applied to the mobile electronic device corresponds to at least one tap operation continuously applied onto a touch screen of the mobile electronic device.

15. The mobile electronic device according to claim 10, wherein the sensor is a touch sensor, and the control gesture applied to the mobile electronic device corresponds to a slide operation applied onto a touch screen of the mobile electronic device.

16. The mobile electronic device according to claim 10, wherein the network module is further with the another mobile electronic device to execute a data transmission through the first proximal wireless network connection.

17. The mobile electronic device according to claim 16, wherein the processor executes an identification procedure before the network module and the another mobile electronic device execute the data transmission, so as to determine whether to execute the data transmission through the network module.

18. The mobile electronic device according to claim 10, wherein if the processor determines that yet another mobile electronic device is searched through the network module and the yet another mobile electronic device detects the control gesture applied to the yet another mobile electronic device, the processor sets the mobile electronic device as an access point, the network module establishes a second proximal wireless network connection between the mobile electronic device and the yet another mobile electronic device,
   the mobile electronic device, the another mobile electronic device and the yet another mobile electronic device execute a data transmission through the first proximal wireless network connection and the second proximal wireless network connection by serving the mobile electronic device as the access point.

* * * * *